(12) United States Patent
Rajendran et al.

(10) Patent No.: US 12,488,316 B2
(45) Date of Patent: Dec. 2, 2025

(54) PERSONAL FINANCIAL NETWORK WITH PERSONALIZED DIGITAL COINS

(71) Applicant: Rotation 5, Inc., Los Altos, CA (US)

(72) Inventors: Priya Rajendran, Los Altos, CA (US); Sen Reeves Xavier, San Jose, CA (US)

(73) Assignee: Rotation 5, Inc., Los Altos, CA (US)

( * ) Notice: Subject to any disclaimer, the term of this patent is extended or adjusted under 35 U.S.C. 154(b) by 381 days.

(21) Appl. No.: 17/241,294

(22) Filed: Apr. 27, 2021

(65) Prior Publication Data

US 2021/0248560 A1 Aug. 12, 2021

Related U.S. Application Data

(63) Continuation of application No. PCT/US2019/064101, filed on Dec. 3, 2019.
(Continued)

(51) Int. Cl.
*G06Q 10/10* (2023.01)
*G06F 16/182* (2019.01)
(Continued)

(52) U.S. Cl.
CPC ......... *G06Q 10/103* (2013.01); *G06F 16/182* (2019.01); *G06Q 10/063114* (2013.01);
(Continued)

(58) Field of Classification Search
CPC ......... G06Q 10/103; G06Q 10/063114; G06Q 20/0655; G06Q 20/3676; G06Q 20/3678;
(Continued)

(56) References Cited

U.S. PATENT DOCUMENTS

2006/0282835 A1 12/2006 Bascom
2008/0270240 A1 10/2008 Chu
(Continued)

FOREIGN PATENT DOCUMENTS

JP 2004326199 A * 11/2004

OTHER PUBLICATIONS

Mearian "What's a crypto wallet (and how does it manage digital currency)?" (2019) (https://www.computerworld.com/article/3389678/whats-a-crypto-wallet-and-does-it-manage-digital-currency.html) (Year: 2019).*

(Continued)

*Primary Examiner* — Sujay Koneru
(74) *Attorney, Agent, or Firm* — NK Patent Law (57) ABSTRACT

Method for managing payment transactions associated with a task completion includes receiving a service assignment and a digital coin value associated with the service assignment over a network from a first computing device associated with a first user, and sending the service assignment over the network for display on a second computing device associated with a second user. The method also includes receiving notification from the second user that the assigned service has been completed, and transferring digital coins equal to the digital coin value of the service assignment from a first digital wallet associated with the first user to a second digital wallet associated with the second user. The method further includes recording the transfer of the one or more digital coins in the digital coin ledger, and applying the one or more digital coins in the second digital wallet to acquire a purchase item.

18 Claims, 3 Drawing Sheets

Related U.S. Application Data (60) Provisional application No. 62/778,931, filed on Dec. 13, 2018.

(51) Int. Cl.

| | | |
|---|---|---|
| *G06Q 10/0631* | (2023.01) | |
| *G06Q 20/06* | (2012.01) | |
| *G06Q 20/36* | (2012.01) | |
| *G06Q 20/38* | (2012.01) | |
| *G06Q 20/40* | (2012.01) | |
| *G06Q 20/42* | (2012.01) | |
| *G06Q 30/0601* | (2023.01) | |
| *G06Q 40/02* | (2023.01) | |
| *G06Q 20/32* | (2012.01) | |
| *G06Q 30/0279* | (2023.01) | |
| *G06Q 50/20* | (2012.01) | |
| *G06Q 50/22* | (2018.01) | |

(52) U.S. Cl.
CPC ..... *G06Q 20/0655* (2013.01); *G06Q 20/3676* (2013.01); *G06Q 20/3678* (2013.01); *G06Q 20/381* (2013.01); *G06Q 20/389* (2013.01); *G06Q 20/405* (2013.01); *G06Q 20/42* (2013.01); *G06Q 30/0633* (2013.01); *G06Q 40/02* (2013.01); *G06Q 20/3278* (2013.01); *G06Q 30/0279* (2013.01); *G06Q 50/205* (2013.01); *G06Q 50/22* (2013.01)

(58) Field of Classification Search
CPC .. G06Q 20/381; G06Q 20/389; G06Q 20/405; G06Q 20/42; G06Q 20/0633; G06Q 20/3278; G06Q 40/02; G06Q 50/205; G06Q 50/22
See application file for complete search history.

(56) References Cited

U.S. PATENT DOCUMENTS

| | | | |
|---|---|---|---|
| 2008/0281721 A1 | 11/2008 | Simunovic | |
| 2011/0237227 A1 | 9/2011 | Kemery et al. | |
| 2012/0215328 A1* | 8/2012 | Schmelzer | G16H 20/30 700/91 |
| 2013/0080326 A1 | 3/2013 | Jacola | |
| 2013/0325530 A1* | 12/2013 | Pal | G06Q 30/0204 705/7.11 |
| 2013/0332337 A1* | 12/2013 | Tran | G06Q 40/03 705/38 |
| 2014/0308638 A1 | 10/2014 | Stout et al. | |
| 2015/0017611 A1* | 1/2015 | Moumneh | G06V 40/166 434/107 |
| 2015/0170112 A1* | 6/2015 | DeCastro | G06Q 20/367 705/39 |
| 2015/0294425 A1* | 10/2015 | Benson | G06Q 40/123 705/31 |
| 2016/0012465 A1* | 1/2016 | Sharp | G06Q 20/321 705/14.17 |
| 2016/0162882 A1* | 6/2016 | McClung, III | G06Q 20/352 705/41 |
| 2016/0292672 A1* | 10/2016 | Fay | H04L 43/08 |
| 2016/0378549 A1* | 12/2016 | Irish | H04L 67/1001 718/107 |
| 2017/0061397 A1* | 3/2017 | Lee | G06Q 20/36 |
| 2017/0061402 A1 | 3/2017 | Mobin et al. | |
| 2017/0317997 A1* | 11/2017 | Smith | G06Q 20/3829 |
| 2017/0344981 A1* | 11/2017 | Jain | G06Q 20/10 |
| 2018/0025442 A1* | 1/2018 | Isaacson | H04L 51/48 705/26.62 |
| 2018/0216946 A1* | 8/2018 | Gueye | G01C 21/3617 |
| 2019/0108499 A1* | 4/2019 | Liu | G06Q 20/10 |
| 2019/0180558 A1* | 6/2019 | Merati | H04L 9/0637 |
| 2019/0188701 A1* | 6/2019 | Parsons | H04L 9/14 |
| 2019/0370448 A1* | 12/2019 | Devine | G06V 40/166 |
| 2020/0162237 A1* | 5/2020 | Chauhan | H04L 9/3247 |
| 2020/0279271 A1* | 9/2020 | Gasperecz | G06N 5/01 |
| 2020/0295949 A1* | 9/2020 | Ding | H04L 9/0637 |

OTHER PUBLICATIONS

WIPO; International Preliminary Report on Patentability for International Patent Application No. PCT/US19/64101 dated Jun. 24, 2021, 7 pages.

ISA/KR; International Search Report and Written Opinion for International Patent Application No. PCT/US2019/064101 dated Apr. 27, 2020, 10 pages.

* cited by examiner

PERSONAL FINANCIAL NETWORK WITH PERSONALIZED DIGITAL COINS

CROSS-REFERENCE TO RELATED APPLICATIONS

This application is a continuation of International Patent Application No. PCT/US2019/064101 filed on Dec. 3, 2019, which claims priority to U.S. Provisional Patent Application No. 62/778,931 filed on Dec. 13, 2018, the entire contents of which is incorporated by reference herein.

TECHNICAL FIELD

Embodiments described herein relate generally to systems and methods for creating and using personalized digital tokens convertible to regular currency for online money-management for use by families and communities operating in a closed environment.

BACKGROUND

Parents aspire to have their children learn to complete household and other assigned activities and further for their children to grow into financially responsible adults. Parents give allowances to children, and these allowances are often tied to completion of certain household activities such as chores. Children learning to complete chores with minimal prodding from parents can help the children grow into responsible, self-managed and independent adults. Children learning to manage allowance money received from their parents in a responsible manner can help the children gain valuable financial management skills. Parents have a vested interest in ensuring that the allowance money that they give to their children is not spent on undesirable items. However, conventional methods of managing how children spend their allowance money do not provide parents with sufficient tools for adequately supervising and controlling how the allowance money is being spent.

With widespread use of mobile computing devices by children, it would be desirable to have a system and method which allows parents adequate control and supervision over how allowance money is spent by their children in a computer-based environment.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is a server for managing payment transactions associated with a task completion within a closed environment. In various embodiments the server includes a memory including a first database configured to store information associated with a plurality of users, a digital coin ledger including records associated with a plurality of digital coins, and a second database associated with a plurality of purchase items each having an assigned digital coin value. The server also includes an application coupled to a processor. The application is configured to receive a service assignment and a digital coin value associated with the service assignment over a network from a first computing device associated with a first user. The application is also configured to send the service assignment over the network for display on a second computing device associated with a second user. The application is configured to receive notification from the second user that the assigned service has been completed, and transfer digital coins equal to the digital coin value of the service assignment from a first digital wallet associated with the first user to a second digital wallet associated with the second user. The application is furthermore configured to record the transfer of the digital coins in the digital coin ledger. In response to a prompt from one or more of the first user and the second user, the application is configured to apply the one or more digital coins in the second digital wallet to acquire one or more purchase items.

Provided herein is a method for managing payment transactions associated with a task completion. The method includes receiving a service assignment and a digital coin value associated with the service assignment over a network from a first computing device associated with a first user. The method also includes sending the service assignment over the network for display on a second computing device associated with a second user. The method further includes receiving notification from the second user that the assigned service has been completed. The method furthermore includes transferring digital coins equal to the digital coin value of the service assignment from a first digital wallet associated with the first user to a second digital wallet associated with the second user, and recording the transfer of the one or more digital coins in the digital coin ledger. In response to a prompt from one or more of the first user and the second user, the method further comprises applying the one or more digital coins in the second digital wallet to acquire one or more of the plurality of purchase items.

DETAILED DESCRIPTION

The following description and figures are illustrative and are not to be construed as limiting. Numerous specific details are described to provide a thorough understanding of the disclosure. In certain instances, however, well-known or conventional details are not described in order to avoid obscuring the description. References to "one embodiment" or "an embodiment" in the present disclosure may be (but are not necessarily) references to the same embodiment, and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way.

Alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

As will be described in greater detail below with reference to the figures, the subject matter described herein provides new systems and methods which allow parents to supervise, manage and control how allowance money is spent by their children in a computer-based environment. Also disclosed herein are new systems and methods which allow project organizers and project leaders to supervise and control how limited funding is spent meaningfully in a computer-based environment as it applies to community-based projects such as church projects, school projects, neighborhood projects, grass-root projects, and not-for-profit projects, among others. Further disclosed herein are new systems and methods which allow educators to supervise and control students learning in a computer-based environment as it applies to education-related projects.

Embodiments of the present invention are directed to providing efficient digital tracking and payment systems and methods for agreements between parents/guardians and the children/minors under their guidance or custody. The system further allows for children/minors and parents/guardians to enter into agreements for services such as household chores, for example, and other actions in exchange for rewards through a single portal digital application configured for tracking the services assigned to children/minors and notifying the appropriate party of completion thereof. The system provides a mechanism for funding and transfer of payments between individuals digitally using mobile devices such as smart phones and computers over a network such as the internet.

The financial transactions can include transfer from an account associated with a parent ("parent accounts" or "first digital wallet associated with a first user") at a financial institutions to an account associated with a corresponding child ("child accounts" or "second digital wallet associated with a second user") at the same or a different financial institution, with both the first and second digital wallets in digital communication with the system. Alternately, both the first and second digital wallets can form part of, or reside within, the system.

The system further advantageously allows for the creation, distribution, and exchange of digital coins convertible to a local currency such as, for example, the US dollar and vice versa, whereby allowances are given in the form of digital coins. The digital coins can advantageously permit a parent/guardian to supervise and control how the digital coins are spent by the child/minor. This can ensure that the allowance money is not spent in pursuits contrary to the goals and objectives that a parent/guardian may have with regard to the allowance given to the child/minor.

The system also allows for members within a community operating in a closed environment to enter into agreements for services in exchange for rewards through a single portal digital application that tracks the services assigned to members within the community and notifies parties of completion thereof. To facilitate project progress and completion, the system provides a mechanism for transfer of payments from one party to another using mobile devices and computers over a network such as, for example, the internet. The financial transactions may include transfers from an account of the project organizer ("manager account" or "first digital wallet associated with a first user") at a financial institution to the account of a project participant ("participant account" or "second digital wallet associated with a second user") at the same or different financial institution, with both the first and second digital wallets in digital communication with the system. Alternately, both the first and second digital wallets can form part of, or reside within, the system.

The system further allows for members within a teaching environment operating in a closed environment such as a school or grade or classroom to enter into agreements for services in exchange for rewards through a single portal digital application that tracks the services assigned to members within the community and notifies parties of completion thereof. To facilitate project progress and completion, the system provides a mechanism for transfer of payments from one party to another using mobile devices and computers over a network such as, for example, the internet. The financial transactions may include transfers from an account of the educator ("educator account" or "first digital wallet associated with a first user") at a financial institution to the account of a learner ("learner account" or "second digital wallet associated with a second user") at the same or different financial institution, with both the first and second digital wallets in digital communication with the system. Alternately, both the first and second digital wallets can form part of, or reside within, the system.

The system will now be described with respect to chores and/or household activities performed in a family setting. However, this system may be applied to several other settings. For example, the system may be beneficially utilized in church projects, school projects, neighborhood projects, school projects, learning environments, grass-root projects, and not-for-profit projects, among others, with limited funding may benefit from a system and method that allows a project organizer to manage how the limited funding is spent meaningfully in a computer-based environment. The customized or customizable digital coin availability made possible by the system can advantageously allow for rewarding task completions within a closed environment.

The system can further provide customized or customizable internal digital coins for its users. These digital coins can be converted into cash value and vice versa. In at least one embodiment, the customized digital coin may be referred to as "s'mores". In some embodiments, the digital coins can be exchanged for tokens, hierarchal certificates, hierarchal accolades, hierarchal citations, and combinations thereof.

Figure 1:
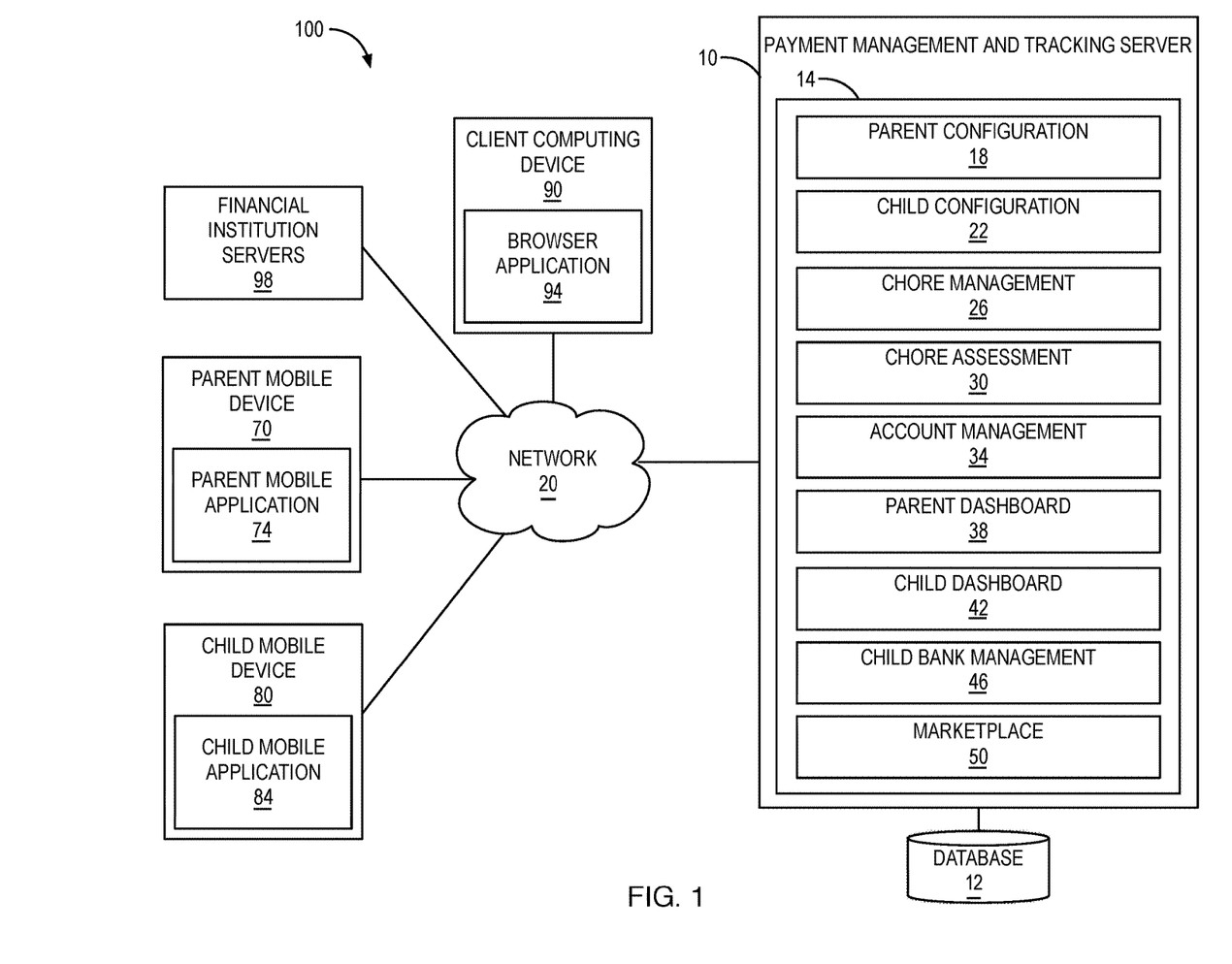
FIG. 1 is a schematic block diagram of a digital payment management and tracking system, according one or more embodiments of the presently disclosed subject matter.

One embodiment of the system will now be described. According to various embodiments of the presently disclosed subject matter, a system such as system 100 as illustrated in FIG. 1 is provided for managing payment transactions associated with a task completion. FIG. 1 is a block diagram of a management and tracking system such as the s'mores management and tracking system (or "system") 100 according to one embodiment of the present invention. The system 100 includes at least one payment management and tracking server such as server 10 operative to communicate with a plurality of user or client computing devices (e.g., mobile devices 70, 80 and client computing device 90). In one embodiment, server 10 is a web server. Server 10 is connected to the mobile devices 70, 80 and client computing device 90 by a network 20 (e.g., the Internet), which may be wired, wireless, or any combination thereof. The mobile devices 70, 80 and client computing device 90 are each operated by a user, such as a parent, guardian, minor, child, project organizer, and project participant, among others. The descriptions below will be discussed in a parent child setting for ease of understanding. In one embodiment, server 10 is a computing device.

By way of non-limiting examples, in FIG. 1, client computing device 90 may be a personal computing device (e.g., a mobile device) the mobile devices 70, 80 may be mobile devices belonging to a parent and a child, respectively. Mobile devices 70, 80 and client computing device 90 may be located remotely from the server 10. Mobile devices 70, 80 and client computing device 90 may include computer hardware and operating environment as found on generic client-side computing devices including mobile devices such as mobile phones, tables, laptops, desktops and the like.

Server 10 is configured with a web application 14 operative to provide a website to the mobile devices 70, 80 and client computing device 90. Server 10 is operative to provide a downloadable parent mobile application 74 for execution on the parent mobile device 70, and a child mobile application 84 for execution on the child mobile device 80. In one embodiment, parent mobile application 74 and child mobile application 84 form sub-parts of web application 14. The web application 14 and mobile applications 74 and 84 may provide similar functionality. The server 10 may include components operable to display the website on the mobile devices 70, 80 and on client computing device 90. For example, server 10 may be operative to cause a web page to be displayed on a display of the mobile devices 70, 80 and client computing device 90 when one of the computing devices requests a URL using a web browser application (e.g., a web browser application 94 of the client computing device 90). Server 10 is also coupled to database 12 that includes storage operative to store information such as user account/profile information, chores, payments, financial account access authorization information, and the like. Server 10 is also coupled to one or more financial institution servers 98 (e.g., servers operated by a bank), which allows the system 100 to transfer funds between internal system accounts as well as external accounts held at one or more external financial institutions. In various embodiments, server 10 is accordingly a server configured for managing payment transactions associated with a task completion. According to at least one embodiment, server 10 comprises a memory including a first database (e.g., database 12 of FIG. 1) configured to store information associated with a plurality of users, a digital coin ledger including records associated with a plurality of digital coins, and a second database (e.g., database 12 of FIG. 1) associated with a plurality of purchase items each having an assigned digital coin value. The first database can include records related to all members within a family, all members within a community, all members within a learning environment, and similar other information.

While system 100 is illustrated as including a single server 10, system 100 may include any number of server computer devices that each perform the functions of the server 10 or cooperate with one another to perform those functions. Further, while the server 10 is illustrated as being connected to the mobile devices 70, 80 and client computing device 90, those of ordinary skill in the art will appreciate that the server computing device may be connected to any number of client computing devices and the server computing device is not limited to use with any particular number of client computing devices.

The web application 14 comprises a plurality of functional modules configured to implement the features of the system. Specifically, the web application 14 comprises a parent configuration module 18, a child configuration module 22, a chore management module 26, a chore assignment module 30, an account management module 34, a parent dashboard module 38, a child dashboard module 42, a child bank management module 46, and a marketplace module 50. Some or all of these modules may also be provided on the mobile device applications 74 and 84 that are executable on the parent mobile device 70 and child mobile device 80, respectively. Several of these functional modules will described in further detail with reference to FIGS. 1-3.

Figure 2:
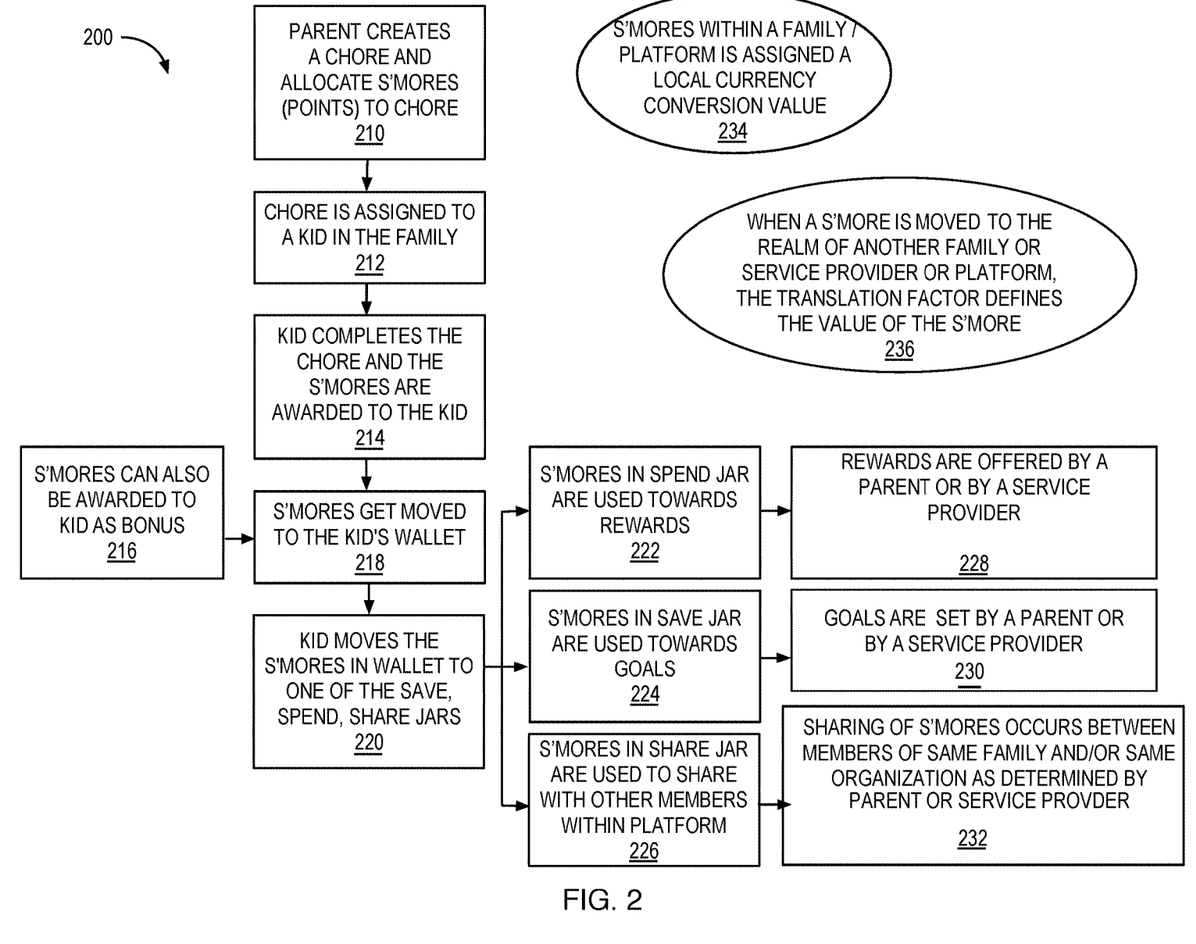
FIG. 2 is a flow chart of various aspects of a digital payment management and tracking system, according one or more embodiments of the presently disclosed subject matter.

FIG. 2 refers to digital coins as s'mores. As explained earlier, the rewards within the system can be in the form of digital coins such as, for example, s'mores (i.e., the term "s'mores" is a name assigned to the digital coins in at least one embodiment whereby children may better relate to the accumulation of digital coins). As illustrated in flowchart 200 of FIG. 2, in one exemplary process, at step 210, a parent creates a chore and allocates one or more s'mores (or points) to the chore; the parent can further assign the chore to a kid. At step 212, the chore is assigned to a kid in the family. At step 214, the system 100, after receiving confirmation from the kid, can send a notification to the parent or other "approver" that a child has completed an assigned chore; further, system 100 can proceed to award the s'mores assigned to the chore to kid. The notification to the parent/approver can be in any suitable form, including email, text message, voice message, "push" notification, etc. The parent/approver is then provided with an opportunity by system 100 to approve the completion of the chore. According to one example, the parent/approver may wish to first inspect the work before providing an approval. In the case when the kid's performance of the chore is unsatisfactory, the parent also has the opportunity "reject" the completion notification and provide feedback to the kid via message (e.g., email, text message, application notification, etc.). As an illustrative example, for the chore that comprises mowing a lawn, a parent/approver may respond to the kid's completion notification with the message "the edges have not been trimmed." The kid may then be given another opportunity to complete the chore in a satisfactory manner. This process may be repeated until the parent/approver is satisfied with the child's performance of the chore. Once the parent/approver has accepted or approved completion of the chore, s'mores corresponding to the value of the completed chore may be awarded and thereby approved for transfer at step 214. In one alternate embodiment, at step 216, the parent/approver may also award bonus s'mores to the kid. At step 218, the awarded s'mores units are transferred from one of the parent's accounts (e.g., the first digital wallet associated with the first user) to the kid's account or wallet (e.g., the second digital wallet associated with the second user). At step 220, the kid moves the s'mores in the kid's wallet to the save jar, the spend jar or the share jar. At step 222, the s'mores in the spend jar are used towards purchase of rewards. At step 228, the reward is offered by the parent or a service provider. In various embodiments, the service provider may be determined by or assigned by system 100.

At step 224, the s'mores in the save jar are used towards the attainment of a predetermined goal; in one embodiment, the goal may represent the collection of 100 s'mores, for example, and when the goal is ultimately reached, the 100 s'mores may subsequently exchangeable, for example, for a trip to an amusement park. At step 230, the goal is set by the parent or a service provider.

At step 226, the s'mores in the share jar can be used to share with one or more other members within the platform. In various embodiments, the other member can be a sibling of the kid, a cousin, a church member, a classmate, a community member, or a similar other member. At step 232, the s'mores may be shared between members of the same family and/or the same organization as determined by the parent or a service provider.

In various embodiments, at step 234, the s'mores within a platform or family is assigned a local currency conversion value. For example, the s'mores within a family setting may be assigned a value of ten s'mores equals one US dollar. In some embodiments, at step 236, when one or more s'mores is moved to another family or service provider or platform, the translation factor assigned at step 234 is used in step 236 for defining the local currency equivalent value of the s'mores being transferred.

In various embodiments, the digital coin ledger is an advantageous aspect of the present invention. In one embodiment, the digital coin ledger resides at server 10. In alternate embodiments, the digital coin ledger may reside at an external data storage device communicatively coupled to the processor of server 10 through the network 20. In one embodiment, the ledger may be distributed whereby the distributed digital coin ledger is held and updated independently by each participant (or node) in a large network; the records are not communicated to various nodes by a central authority, but are instead independently constructed and held by every node; that is, every single node on the network processes every transaction, coming to its own conclusions and then voting on those conclusions to make certain the majority agree with the conclusions. Once there is this consensus, the distributed ledger has been updated, and all nodes maintain their own identical copy of the ledger. This architecture may advantageously allow for dexterity as a system of record that goes beyond being a simple database. The digital coin ledger as referred to herein may conveniently apply to both static data (a registry), and dynamic data (transactions). The digital coin ledger may permit users to move beyond the simple custodianship of a database by providing for management of a system of record.

In one embodiment, the digital coins managed by server 10 use cryptography for security since a digital coin with cryptography security (alternately referred to as a "cryptocurrency") is difficult to counterfeit because of this security feature. The cryptocurrency may be based on blockchain technology. In one embodiment, the digital coins managed by the server may be modeled after, and have specifications similar to that of, the Bitcoin cryptocurrency. In one embodiment, the digital coins may be assigned a trade name or service name "s'more" in singular and "s'mores" in plural. In various embodiments, the server uses blockchain technology to store an online ledger of all the transactions that have ever been conducted using s'mores (also referred to herein as the "digital coin ledger") with every new block generated required to be verified by the ledgers of each user on the s'mores market, making it almost impossible to forge transaction histories. The s'mores market may be limited to a home environment or to a local community in some embodiments; in other embodiments, the s'mores may not have any such restrictions and thus could be trade-able across several environments as determined by the administrator of the system.

In several embodiments, the purchase items may represent one or more of goods and services provided by a vendor offering preferred market pricing. In various embodiments, the purchase items can include activities enjoyed by children such as: watching movie with mom; baking cake with mom; playing soccer with dad; playing a board game with mom and/or dad; permission to hang out at friend's house; spending time at mom's or dad's office; and, similar other activities that do not necessarily involve expenditure of money but may be of value to the child, the minor or the project participant. In some embodiments, some of the items available for purchase may not have a monetary value assigned to the same. In some other embodiments, the items without monetary value may nonetheless be assigned a digital coin value or a s'mores value. For example, in one embodiment, a "smart child-level 1" certification may require digital coins in order for a child or kid to acquire it; however, the "smart child-level 1" certification may not include a local currency value directly assigned to it.

Server 10 can further include a processor as well as instructions in the form of a computer program that is executable by the processor. In various embodiments, through the execution of computer program (for example, in the form of web application 14) by the processor, the processor is configured to receive a service assignment and a digital coin value associated with the service assignment over a network from a first computing device associated with a first user. The processor is also configured to send the service assignment over the network for display on a second computing device associated with a second user. The processor is further configured to receive notification from the second user that the assigned service has been completed. The processor is furthermore configured to transfer digital coins equal to the digital coin value of the service assignment from a first digital wallet associated with the first user to a second digital wallet associated with the second user. The processor is additionally configured to record the transfer of the one or more digital coins in the digital coin ledger. The processor is also configured to, in response to a prompt from one or more of the first user and the second user, apply the one or more digital coins in the second digital wallet to acquire one or more purchase items.

In various embodiments, system 100 or server 10 is further configured to convert the digital coins in the second digital wallet to an equivalent cash value based on a predetermined conversion rate. Server 10 is also configured to transfer the equivalent cash value from the first digital wallet to the second digital wallet. In various embodiments, the first digital wallet can be linked to an external financial institution server owned by an entity such as a bank or a credit union or a credit provider such as a credit card issuing company. System 100 or server 10 can be further configured to add funds to the first digital wallet from the external financial institution server. In other words, server 10 and/or system 100 is configured for automatic transfer of funds from a bank to the first digital wallet and vice versa. In some embodiments, server 10 and/or system 100 is configured for automatic transfer of funds from a bank to the second digital wallet and vice versa. In various embodiments, server 10 and/or system 100 can be further configured to receive an approval notification from the first user prior to transferring the one or more digital coins to the second digital wallet. As noted earlier, the digital coin ledger resides on an external data storage device communicatively coupled to the processor of server 10.

In various embodiments, the first user can be a parent, caretaker, guardian, teacher or project owner/organizer/leader or a similar other individual, and the second user can be a child, a student, a project worker/member or a similar other individual. For example, in one embodiment, the second user is a child and the first user is a parent of the child. In another embodiment, the second user is a project member and the first user is a project organizer.

In various embodiments, server 10 is configured to communicate with an application executing on one or more of the first computing device such as parent mobile device 70, and the second computing device such as child mobile device 80. For example, the application can include a component such as parent mobile application 74 executing on the first computing device such as parent mobile device 70, and a component such as child mobile application 84 executing on the second computing device such as child mobile device 80. Server 10 and/or system 100 is further configured to display on a graphical user display of the second computing device, links to the plurality of purchase items. In some embodiments, the mobile application can further be accessed via a browser application such as browser application 94 executing on the client computing device such as client computing device 90.

In various embodiments, server 10 is configured to maintain a history of subsequent transactions associated with the one or more digital coins in the digital coin ledger. In some embodiments, server 10 is further configured to transfer the one or more digital coins to another server operating outside the closed environment. In some embodiments, server 10 is further configured to transfer the equivalent cash value to a further server operating outside the closed environment.

In various embodiments the server is also configured to apply near field communication (NFC) technology to allow the second user to pay for the acquired purchase items. This way, the second user (or the first user) can advantageously pay for an item at a store via the mobile application forming part of system 100 using the NFC technology.

In various embodiments, the system accordingly provides for a server for managing payment transactions associated with task completion within a closed environment. The server includes a memory containing a database configured to store information associated with a plurality of users, a digital coin ledger with records associated with a plurality of digital coins, and a list associated with a plurality of purchase items each having an assigned digital coin value. The system further includes a processor configured to receive an assignment of a service and an associated digital coin value by a first user to a second user via a first client computing device operated by the first user over a network. In one embodiment, the assignment represents a household chore assigned by a parent to a child. In another embodiment, the assignment is a task assigned by a project leader or manager or organizer to a project participant. The processor sends the assigned service to the second user (e.g., a child) over the network for display on a second client computing device operated by the second user. The processor further transfers digital coins equal to the digital coin value of the assigned service from a first digital wallet associated with the first user to a second digital wallet associated with the second user after receipt of notification from the second user indicating the assigned service has been completed.

Figure 3:
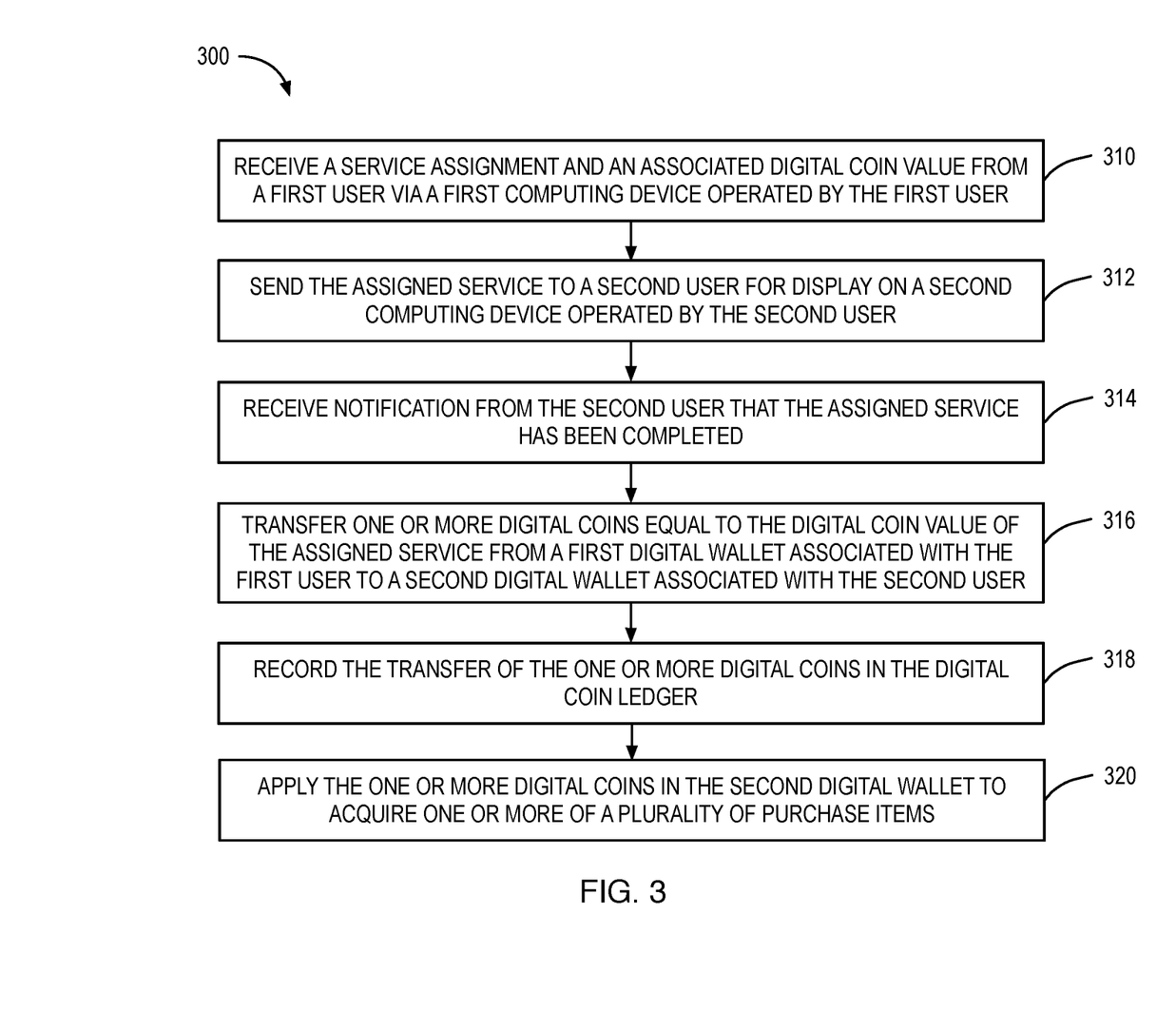
FIG. 3 is a flow chart of various aspects of a digital payment management and tracking system, according one or more embodiments of the presently disclosed subject matter.

One method of managing payment transactions associated with task completion within a closed environment is illustrated in flowchart 300 of FIG. 3. As illustrated in FIG. 3, the method includes receiving a service assignment and an associated digital coin value from a first user via a first computing device operated by the first user, at step 310. The method further includes sending the assigned service to a second user for display on a second computing device operated by the second user at step 312. The method also includes receiving notification from the second user that the assigned service has been completed at step 314. The method furthermore includes transferring transfer one or more digital coins equal to the digital coin value of the assigned service from a first digital wallet associated with the first user to a second digital wallet associated with the second user at step 316. The method additionally includes recording the transfer of the one or more digital coins in the digital coin ledger at step 318. The method also includes applying the one or more digital coins in the second digital wallet to acquire one or more of a plurality of purchase items at step 320.

Advantageously, the processor forming part of the server or the digital ledger operates to record the transfer in the digital coin ledger. The digital ledger maintains a continuous and ongoing record associated with each digital coin issued by the system, until instructed otherwise by the system's rules as set by the administrator of system 100. In response to a prompt from the second user, the processor applies the one or more digital coins in the digital wallet associated with the second user to acquire one or more purchase items. The purchase items need not necessarily have a cash value associated with them. For example, a movie night with mom may be one of the items available for purchase. The purchase items may represent any item that may have a perceived value from the perspective of a child, a minor, or a project participant. In some embodiments, the server or system waits for receipt of an approval notification from the first user prior to transferring the one or more digital coins to the second digital wallet associated with the second user.

In some embodiments, the server is further configured to convert the digital coins in the second digital wallet to an equivalent cash value based on a predetermined conversion rate. For example, in one embodiment, the server allows the first user to assign a conversion rate for converting the s'mores digital coins to an equivalent currency value. As an illustrative example, the first user may assign a conversion rate of 100 s'mores digital coins to a US dollar; in some embodiments, each family may assign its own arbitrary conversion rate from the s'mores digital coins to a US dollar. In some embodiments, the server is also configured to transfer the equivalent cash value from the first digital wallet either to the second digital wallet or to a central repository. This way the first user will understand that the underlying cash has been effectively expended. In various embodiments, the first digital wallet is linked to an external financial institution server. The external financial institution may represent a bank, a credit union, or a credit card provider in various embodiments. The server is further configured to add funds to the first digital wallet from the external financial institution server. For example, as set up by the first user, the server may periodically transfer a predetermined amount of money from an account associated with the first user from the external financial institution to the first digital wallet associated with the first user.

In various embodiments, the server is capable of communicating with a mobile application executing on a mobile client computing device such as parent mobile device 70 and child mobile device 80. The server is additionally capable of displaying on a graphical user (GUI) display of the mobile client computing device, links to the plurality of purchase items. The plurality of purchase items may be directly stored at the server in some embodiments. In other embodiments, the server may only maintain links to a plurality of items which are stored at another online location. The mobile application operating on the mobile device may display on the GUI of the mobile device various aspects associated with the system. In one embodiment, the mobile application allows for touch-based interaction with the server and the system. In the same or a different embodiment, the application allows for voice-based interaction with the server and the system.

In some embodiments, a predetermined conversion rate is set by the first user. In various embodiments, the server permits the first user to assign restrictions on how the s'mores digital coins are expended. For example, a parent may prohibit a child from using the digital coins to purchase tobacco products. In some embodiments, the restriction is associated with a maximum expendable amount over a predetermined time period. For example, a parent may allow a maximum of ten US dollars to be expended during a 30-day period. In another example, the restriction may be associated with a spend rate per unit of time at which the one or more digital coins can be expended. For example, the first user may stipulate that a maximum of 100 US dollars can be spent within each quarter of a year. In some embodiments, the restriction is associated with a specified period of time before which the digital coins cannot be expended. For example, a parent may allow an allowed digital coin amount to be expended after a 30-day waiting period in order to teach delaying of gratification to a child. In a further example, the restriction may be associated with a predetermined list of organizations or individuals or entities to which the one or more digital coins can be transferred to; for example, the s'mores digital coins may be restricted for used with for purchase of only healthy food items as determined by the parent, guardian or project organizer. In another example, the s'mores digital coins may only be expended for purchase of school supplies. In another example, the s'mores digital coins may only be donated to one or more predetermined charities. In another example, the first user may provide a second user a specified subset of the plurality of purchase items on which the earned s'mores digital coins can be expended by that second user. In some embodiments, the purchase items include one or more of goods and services provided by a vendor offering preferred market pricing. In various embodiments, after the first transfer of digital coins from the first user to the second user, the server maintains a history of subsequent transactions associated with the one or more digital coins in the digital coin ledger.

In one embodiment, the server is further configured to transfer the s'mores digital coins (or "s'mores" in short) accumulated by the second user to another server operating outside of the closed environment where the s'mores were generated; the s'mores may be converted to an equivalent local currency (e.g., US dollars) prior to the transfer to the other server. In one embodiment, the other server may represent an internet marketplace such as, for example, Amazon, Ebay, or a similar other online marketplace. In one embodiment, the server is further configured to facilitate purchase of good and services provided by vendors unrelated to the closed environment using the equivalent cash value. In one embodiment, the vendors unrelated to the closed environment may not recognize the s'mores and accordingly the equivalent cash value may be used for the completion of purchase transactions.

In some embodiments, several vendors may be recruited to be part of the s'mores environment whereby the recruited vendors may recognize the s'mores as alternatives of the underlying cash value assigned to them by a responsible party operating within the s'mores system. In one embodiment, the server is configured to use near field communication (NFC) technology to allow the second user to pay for the acquired purchase item.

The s'mores digital coins as described herein may be used in conjunction with a parenting platform or system with a trade name or service name "S'moresUp" designed to help modern-day parents tackle parenting challenges. In one embodiment "S'moresUp" can include components such as web application 14, parent mobile application 74, child mobile application 84, and one or more components of payment management and tracking server 10 listed in FIG. 1. S'moresUp as an online platform system may permit digitized control over allowances provided to children. S'moresUp may thus provide a simple and easy chore management system that manages all aspect of the chore-reward system. The list of chores may be created and managed by parents. The created chores may be assigned to anyone within a family. In one embodiment, each chore may possess the following attributes: name of the chore; points (i.e., s'mores) assigned to the chore; frequency at which the chore needs to be completed (e.g., daily, weekly, monthly, or one-time occurrence, as application) and the name of the person/child that the chore is being is assigned to.

S'mores collected within the S'moresUp platform or S'moresUp system may accrue in the digital wallet associated with each child. Completing a chore is just one way to earn s'mores. Another way a child may earn s'mores is when a parent awards some bonus s'mores, for example. S'mores collected may be traded in for small ticket items or for big ticket items. The rewards and goals (i.e., the purchase items) may represent material things that have an inherent value associated with them (e.g., pizza or toys) or an activity within the family (e.g., movie night with mom).

Each family may assign an arbitrary s'mores to US dollar conversion value, for example. The conversion rate may differ from family to family. The conversion value is advantageous when a s'more is moved outside of a family's network or when the s'more exchanged from real money. S'mores may be spent on rewards assigned by parents; a s'more may be shared with members of the same family or in another family; a s'more may also be shared with other organizations registered within the platform, system or server. A s'more may be divided into subunits in some embodiments. A s'more may also be shared between families.

The server may maintain information regarding how a particular s'more got into the system and all the transactions that the particular s'more was associated with. A s'more created in the system is unique and may be traced back to the creator. A s'more may have restrictions associated with it as to where it can be expended (e.g., a specific service or merchant or a group or a category). In one embodiment, a s'more may also have restrictions associated with such that it can only be used within a realm of a group of families or a selected geographical location. In various embodiments, a s'more is backed by real money (e.g., backed by a local currency such as the US dollar) when it is moved between realms such that when a s'more crosses from one realm to another, real money is moved between realms. In some embodiments, a s'more may include an identifier such as a family name indicative of the family that requested generation of that s'more. The s'more may also be designed and personalized to possess unique attributes as it travels in the virtual space. The flow chart below indicates one embodiment associated with the implementation of the invention as described herein.

In some embodiments, a new set of unique s'mores may be issued to commemorate a birthday, an anniversary, or a similar other event or occurrence referred to herein as "commemoration s'mores". Commemoration s'mores may be issued to folks outside a family circle. In one example, all attendees to a birthday party may receive one or more commemoration s'mores associated with the event. The recipients of the commemoration s'mores may be assigned a closed community group by the server or the system whereby the commemoration s'mores can be traded or otherwise expended for purchase articles available within the S'moresUp closed community platform, and optionally outside of the S'moresUp closed community platform.

In another embodiment, the s'mores issued within one family environment may be labeled based on the family's name. This has the effect of creating digital coins customized for a particular family, in effect creating a family digital currency. This may advantageously allow all members within an extended family to possess, exchange, and otherwise use a digital coin customized for use just by that family. Such customized family digital coins would be allocated a conversion rate for converting into a local currency such as the US dollar.

Children may earn money in a variety of manners. For example, some parents may provide a child with an allowance under a pre-determined schedule (i.e., weekly, monthly, etc.). Some parents may provide an allowance based on whether or not a child completes their assigned chores. Children may also earn s'mores by performing special projects from time-to-time, or as gifts (birthdays, special events, holidays etc.) from family members and friends. The s'mores tracking feature may be configured to tag sources and uses of s'mores so that the child and the parent are able to clearly track where their money has come from and where it goes.

A parental control module that forms part of parent mobile application 74 may enable a parent to have oversight over their children's accounts. The parent control module may be configured to enable a parent to create accounts for their children, decide how their children's s'mores should be allocated to each of the children's sub-accounts as applicable, and to review, authorize and administer children's spending, sharing, and savings.

A child account management module that forms part of child mobile application 84 provides tools which enable a child to exercise some control over their account. For example, the child account management module provides an interface which enables a child to view their funds in the form of s'mores, make purchases, make saving and investment decisions, and/or choose charities for making s'mores donations to. Some or all of these activities may require parental approval. The child account management module may also provide an interface which enables the child to view a schedule of when, how much, from whom and in what way, s'mores (and consequently real money) can be earned.

A spending module that forms part of child mobile application 84 may be provided to present an interface to one or more trusted on-line vendors. In some embodiments, the online vendors allow children to purchase gift cards. In other embodiments, the vendors provide full e-commerce functionality through the money management system or platform. In some embodiments, children may be able to make purchases from vendors other than the online vendors using the s'mores. In some embodiments, the spending module is further configured to facilitate purchase of one or more of goods and service provided by a vendor not listed within using the equivalent cash value. In some embodiments, spending module is provided with a predetermined list of organizations or individuals to which the digital coins can be transferred to. In some embodiments, the system can include a restriction associated with a specified subset of the plurality of purchase items on which the digital coins can be expended. In some embodiments, the system can include a restriction associated with a rate at which the one or more digital coins can be expended.

A sharing module that forms part of child mobile application 84 may provide an interface for making donations to one or more charitable partners. The sharing module may also enable children to collectively pool their sharing account funds or establish, lead and/or join a particular cause of interest which other members may donate to.

A savings module that forms part of child mobile application 84 may be provided to enable a child to explore savings and investment options. For example, the savings module may be configured to provide options for how money (associated with the accrued s'mores) is best saved and invested. This may include, presenting different saving account options with differing terms and interest rates for example, savings accounts, money market funds, certificates of deposits, and/or other investment opportunities. In some embodiments, the savings module will invest real money associated with the accrued s'mores, through decisions directed by the child, and approved by the parent following all applicable laws and regulations.

Child accounts that forms part of child mobile application 84 may be partitioned into a savings account, a spending account, and a sharing account. Savings accounts encourage online saving and safe investing. Share accounts allow children to direct money allocated by the parent and/or child for sharing to be donated to charities of the child's choice. Spend accounts provide a private and secure channel for kids to conduct smart online commerce. Parents may establish allocation levels for each of their child's three accounts. For example, assuming allocations of 80% saving, 5% sharing, and 15% spending would suggest that for every $10 a child earns, $8 will be allocated to savings, $0.5 to sharing, and $1.5 to spending According to some embodiments, a child may suggest an allocation, and the parent can then approve or disapprove of the allocation. Additionally, parents and children can agree on what percentage of the child's earned money (corresponding to the earned s'mores) will be allocated to their sharing account. While the parent retains complete control over all settings (e.g., allocations, amounts, purchases, etc.), the child feels empowered by initiating spending, saving and sharing decisions, learning from visual and descriptive information flows, and by being an active member of the decision process.

The systems and methods of the present application provide for online money management, wherein children learn money management skills and cultivate their social conscience. These systems and methods provide a convenient, easy, safe, and controlled environment that teaches financial responsibility, while imparting family values in a child through financial decision-making and tangible giving. Children are experientially empowered to manage "their" money, making it real, visual, and fun. Children are provided with opportunities to earn money from family and friends in many ways, including a traditional allowance, an allowance received in exchange for completed chores, through the completion of special projects and/or tasks, from the receipt of gifts and in other ways. Earned money is then allocated by the parent/guardian or child and deposited as s'mores to a child's save, spend, and share accounts. The digital wallets allow for real-time consumption of products or services while teaching the importance of smart spending and delayed gratification. The digital wallets also allow kids to make tangible donations with their own money toward causes of interest most important to them. The ability to track the history of all transactions associated with each assigned s'more provides comfort to parents knowing that they have complete control of their children's online financial and social experience. The systems and methods described herein thus provide a financially transparent model which engenders trust, promotes financial education, and provides sound saving and spending opportunities through the advantageous use of s'mores digital coins.

According to one aspect of the invention, the S'moresUp platform may include a social media feature to facilitate communication between and among families that provides a network for parents to connect with other parents through the platform/network. In one embodiment, a parent may be able to view those posts from fellow parents that are tagged either as "community" (whereby the post is viewable by every parent on the S'moresUp platform) or as "friends & family" (whereby the post is viewable only to those parents that are connected to the family that posted the content). By default, both "community" posts as well as the "friends and family" posts are not viewable from a child account irrespective of whether the child belongs to the "connected" family. However, the S'moresUp platform may permit a parent that is able to view the post to share such a "parent only" post with one or more children within that parent's family by clicking on the action "share" and then forwarding/sharing the post with one or more children in the family such that the selected children can view the post when they sign in to the S'moresUp platform from their individual child accounts. This feature may advantageously create a firewall for children with accounts in S'mores Up platform whereby the parent of each child in the platform may act as a gatekeeper to determine whether to pass on information shared at the "parents" account level to a child's account as appropriate.

According to another advantageous feature, when a child posts something from the child's account, such post may only be viewable by members within the same family as the child, but not by any other members within the S'moresUp platform including members of a family that is connected to the family to which the child is a member of. However, the S'moresUp platform may permit a parent to share such a "family only" post at different audience levels as determined by the parent—with other connected parents, with other connected families (this would include children accounts within the connected families), or with everyone having an account on the S'moresUp platform. The parent may accomplish this by clicking on the action "share" and then forwarding/sharing the post with the selected audience. This feature too creates a firewall for protecting children with the respective parent acting as a gatekeeper to determine whether to pass on information shared within the family to a larger audience within the S'moresUp environment. In one embodiment, the parent may be able to control which individuals the children within the family can connect to. For example, a child in a first family may be able to connect to another individual in a second family within the S'moresUp platform only after a parent in the first family authorizes such a connection. The size of S'moresUp platform as described herein may represent any number of members as determined by the administrator or by any responsible party authorized by the administrator.

In some embodiments, the system can seamlessly integrate with other smart devices including smart appliances such as, for example, laptop computers, desktop computers, tablets, television sets, refrigerators, washing machines and dryers, dishwashers, ovens including microwave ovens, and smart cars, among others, in order to manage and track completion of chores, and to facilitate rewarding of appropriate folks when such chores are completed to satisfaction.

In some embodiments, they system can seamlessly integrate with a financial institution such as a bank issuing credit/debit cards through which a child may be able to spend the earned s'mores points for making contributions to worthy projects by making payments using the credit/debit card, wherein the credit/debit card accrues the local currency value equal to the s'mores points earned by a given child based on the assigned conversion rate. The system can additionally allow for the integration of a wish list service (such as, for example, the wish list service provided by Amazon, eBay and similar other service providers) into the s'mores reward system such that such outside wish list items may be listed in the rewards list for a child or individual to redeem through the system as described herein.

In various embodiments, the system also provides for the ability of a child to trade-in the earned s'mores to "buy" screen-time through the system. For example, when a s'mores reward is claimed and approved by a parent or adult, the system can operate to permit a device associated with the child to get automatically unlocked and stay unlocked for pre-determined time period in order for the child to use the device to view and/or interact with various content such as, for e.g., YouTube videos, social media applications, video games, and similar other content.

In some embodiments, the system can require an approval of a parent or adult before an amount of s'mores that has previously been awarded to a child can be made available for use by the child, even though the child has technically already "earned" those s'mores. According to at least one embodiment, a chore is set up by a parent or adult and the s'mores assigned for the chore is transferred to a child's account after a parent or adult approves the completion of a chore. The parent or adult can optionally require a photograph proof illustrating the completed chore; the s'mores assigned for the chore get transferred to the child's account only after the parent or adult is satisfied with the photograph. The system can further require that the s'mores reward claimed by a child is approved by a parent or adult for spending before the child can actually spend the s'mores reward.

In some embodiments, the system is configured to charge a penalty against the amount of s'mores assigned to a chore if the chore is not completed within the assigned time frame. In some embodiments, the penalty for being late may be a percentage of the amount of s'mores assigned to the chore, and the system may move the penalty s'mores amount to an assigned digital jar controlled by the system. The settings for items such as the penalty s'mores percentage, the digital jar assigned to collect the penalty s'mores, and similar other items can be adjusted through a user interface available within the system.

The system can be further configured to integrate with a cloud based digital home management environment such as, for example, Amazon's Alexa, Google's Home, Microsoft's Cortana, Apple's Siri, and similar other environments and applications. The application associated with the system as described herein can be added as a skillset in one or more of such ecosystems and downloaded onto the cloud based digital home management environment whereby the system can integrates with, and operate seamlessly within, such ecosystems.

In some embodiments, the system can further include enhanced features suited for special need individuals including individuals with autism, individuals with attention deficit hyperactivity disorder (ADHA). In some embodiments, the system can further include enhanced features suited for individuals recovering from substance abuse and for individuals in recovery houses or otherwise in recovery programs. The system can advantageously help various individuals in maintaining a schedule for their chores/tasks.

In various embodiments, system 100 can include additional features such as:
a. Ability to render a chore or group OF chores Inactive or suspended;
b. Ability to add a category to blog posts appearing within a community
c. Ability to take away the awarded s'mores for misbehavior, for example
d. Ability to provide advanced chore types such as compete, Collaborate, anytime, optional and rotate
e. Ability for all devices within the family to get a notification when a comment is added to a post on a family wall
f. Ability to perform analytics for each platform or each family
g. Ability to rate the mobile application
h. Ability to add a comment to the posts
i. A separate kid's dashboard
j. Ability to pick a picture from S'mores gallery for customization purposes
k. Ability to associate wish list available on a web-based service provider such as, for example, Amazon to the rewards section of the application
l. Ability to automatically allocate between the spend, save, give buckets/jars
m. Ability to have awards, bonus, rewards & takeaway tiles to be visible only to parents and the child that has been awarded the same
n. Ability to add calendar event notifications for chores
o. Ability to view the chore report from parent's webpage and child's webpage
p. Ability to select optional due date while creating/editing a recurring chore
q. Ability to provide for a chore lock such that when a kid picks up a unassigned chore, that chore is locked out for other kids
r. Ability for a notification to be triggered to all devices within the family when a family post is posted by a member of the family
s. Ability for a notification to be triggered when a chore is assigned to a person The systems and methods described herein may be implemented using commercially available devices, such as, for example cellular phones (e.g., Apple iPhone, Android devices) and network-enabled devices (e.g., desktop computer, laptop computer, tablets, netbooks, 2-in-1 computers, etc.).

It will be appreciated that that systems and methods described herein may be implemented using various types of user interfaces, such as user interfaces that allow the users to log in and update their profile, availability, etc. For example, as explained above, the user interface may be implemented in a mobile app, or on a web browser.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby®, JavaScript®, Java®, Python®, PHP, C, C++, C#, Objective-C®, Go®, Scala®, Swift®, Kotlin®, OCaml®, or the like. The program code may execute entirely on the user's computer, partly on the user's computer, as a stand-alone software package, partly on the user's computer, and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A server for managing payment transactions associated with a task completion within a closed environment, the server comprising:
   a memory including a first database configured to store information associated with a plurality of users, a digital coin ledger including records associated with a plurality of digital coins, and a second database configured to store information associated with a plurality of purchase items, each purchase item having an assigned digital coin value; and,
   an application coupled to a processor, the application configured to:
      receive a service assignment and a digital coin value associated with the service assignment over a network from a first computing device associated with a first user;
      send the service assignment over the network for display on a second computing device associated with a second user;
      receive notification from the second user that the assigned service has been completed;
      receive notification from the first user confirming that the assigned service has been completed;
      transfer digital coins equal to the digital coin value of the service assignment from a first digital wallet associated with the first user to a second digital wallet associated with the second user;

record the transfer of the digital coins in the digital coin ledger;

automatically allocate the digital coins in the second digital wallet between a plurality of sub-accounts ("jars"),
   wherein the plurality of sub-accounts in the second digital wallet includes a spend jar, a save jar, a share jar, and a penalty jar,
   wherein the digital coins in the spend jar are used to acquire one or more of the plurality of purchase items,
   wherein the digital coins in the save jar are blocked from being used to acquire one or more of the plurality of purchase items until a predetermined threshold is reached,
   wherein the digital coins in the share jar are combinable with digital coins of a third user to acquire one or more of the plurality of purchase items, and
   wherein the digital coins in the penalty jar are blocked from being used to acquire one or more of the plurality of purchase items; and
charge a penalty amount of digital coins if the assigned service was not completed within a predetermined time frame and automatically transfer the penalty amount to the penalty jar;
in response to a prompt from one or more of the first user and the second user, apply the one or more digital coins in the second digital wallet to acquire one or more of the plurality of purchase items,
wherein the server is further configured to exchange the digital coins in the second digital wallet for at least one of: hierarchal certificates, hierarchal accolades, and hierarchal citations,
wherein the server is further configured to:
   automatically unlock a video device for a time period in exchange for the digital coins in the second digital wallet; and
   automatically lock the video device after the time period has elapsed.

2. The server of claim 1, wherein the server is further configured to transfer an equivalent cash value from the first digital wallet to the second digital wallet.

3. The server of claim 2, wherein the first digital wallet is linked to an external financial institution server.

4. The server of claim 3, wherein the server is further configured to add funds to the first digital wallet from the external financial institution server.

5. The server of claim 1, wherein the server is further configured to receive an approval notification from the first user prior to transferring the digital coins to the second digital wallet.

6. The server of claim 1, wherein the digital coin ledger resides on an external data storage device communicatively coupled to the processor.

7. The server of claim 1, wherein the second user is a child and the first user is an adult associated with the child.

8. The server of claim 1, wherein the second user is a member of a project and the first user is an organizer of the project.

9. The server of claim 1, wherein the server is further configured to communicate with a mobile application executing on one or more of the first computing device and the second computing device.

10. The server of claim 1, wherein the server is further configured to display on a graphical user display of the second computing device, links to the plurality of purchase items.

11. The server of claim 10, wherein the plurality of purchase items are one or more of goods and services provided by a vendor offering preferred market pricing.

12. The server of claim 1, wherein the first user assigns a restriction on how the digital coins are to be expended.

13. The server of claim 12, wherein the restriction is associated with a maximum expendable amount over a predetermined time period.

14. The server of claim 1, wherein the server is further configured to maintain a history of subsequent transactions associated with the one or more digital coins in the digital coin ledger.

15. The server of claim 1, wherein the server is further configured to transfer the one or more digital coins to another server operating outside the closed environment.

16. The server of claim 1, wherein the server is further configured to transfer an equivalent cash value to a further server operating outside the closed environment.

17. The server of claim 1, wherein the server is further configured to use near field communication (NFC) technology to allow the second user to pay for the acquired one or more of the plurality of purchase items.

18. A method for managing payment transactions associated with a task completion, the method comprising:
   providing a server comprising: a memory including a first database configured to store information associated with a plurality of users, a digital coin ledger including records associated with a plurality of digital coins, and a second database configured to store information associated with a plurality of purchase items, each purchase item having an assigned digital coin value; and, an application coupled to a processor;
   receiving a service assignment and a digital coin value associated with the service assignment over a network from a first computing device associated with a first user;
   receiving notification from the first user confirming that the assigned service has been completed;
   sending the service assignment over the network for display on a second computing device associated with a second user;
   receiving notification from the second user that the assigned service has been completed;
   transferring digital coins equal to the digital coin value of the service assignment from a first digital wallet associated with the first user to a second digital wallet associated with the second user;
   recording the transfer of the one or more digital coins in the digital coin ledger;
   automatically allocating the digital coins in the second digital wallet between a plurality of sub-accounts ("jars"),
      wherein the plurality of sub-accounts in the second digital wallet includes a spend jar, a save jar, a share jar, and a penalty jar,
      wherein the digital coins in the spend jar are used to acquire one or more of the plurality of purchase items,
      wherein the digital coins in the save jar are blocked from being used to acquire one or more of the plurality of purchase items until a predetermined threshold is reached,
      wherein the digital coins in the share jar are combinable with digital coins of a third user to acquire one or more of the plurality of purchase items, and wherein the digital coins in the penalty jar are blocked from being used to acquire one or more of the plurality of purchase items;

charging a penalty amount of digital coins if the assigned service was not completed within a predetermined time frame and automatically transferring the penalty amount to the penalty jar; and in response to a prompt from one or more of the first user and the second user:

exchanging the digital coins in the second digital wallet for items including at least one of: hierarchal certificates, hierarchal accolades, and hierarchal citations;

applying the one or more digital coins in the second digital wallet to acquire one or more of the plurality of purchase items;

automatically unlocking a video device for a time period in exchange for the digital coins in the second digital wallet; and automatically locking the video device after the time period has elapsed.

\* \* \* \* \*